United States Patent [19]

Atkinson et al.

[11] 4,361,657

[45] Nov. 30, 1982

[54] CROSS-LINKED HYDROGEL COPOLYMERS FOR CONTACT LENSES

[75] Inventors: Ivor B. Atkinson, Chessington; Barry C. Holdstock, Morden, both of England

[73] Assignee: Global Vision (U.K.) Ltd., Hants, England

[21] Appl. No.: 98,479

[22] Filed: Nov. 29, 1979

[30] Foreign Application Priority Data

Nov. 30, 1978 [GB] United Kingdom ............... 46681/78

[51] Int. Cl.$^3$ ................................................ G02C 7/04
[52] U.S. Cl. ..................................... 523/106; 525/302; 525/313; 526/317; 526/323.1; 526/336
[58] Field of Search ................. 260/29.7 W, 29.7 UP, 260/29.7 H, 29.7 T; 523/106

[56] References Cited

U.S. PATENT DOCUMENTS 3,876,581  4/1975  Neogi ............................ 260/29.7 W

FOREIGN PATENT DOCUMENTS 1475605  6/1977  United Kingdom .

Primary Examiner—Harold D. Anderson
Attorney, Agent, or Firm—Thomas R. Boland

[57] ABSTRACT

The invention relates to soft contact lenses having a water content of at least about 45% and comprising a hydrated copolymer of a major proportion of an hydroxyalkyl acrylate or methacrylate, up to 12% by weight of an ethylenically unsaturated acid or anhydride, a minor proportion of a cross-linking monomer and a minor proportion of styrene or a substituted styrene, the free acid or anhydride groups being in salt form.

6 Claims, 1 Drawing Figure

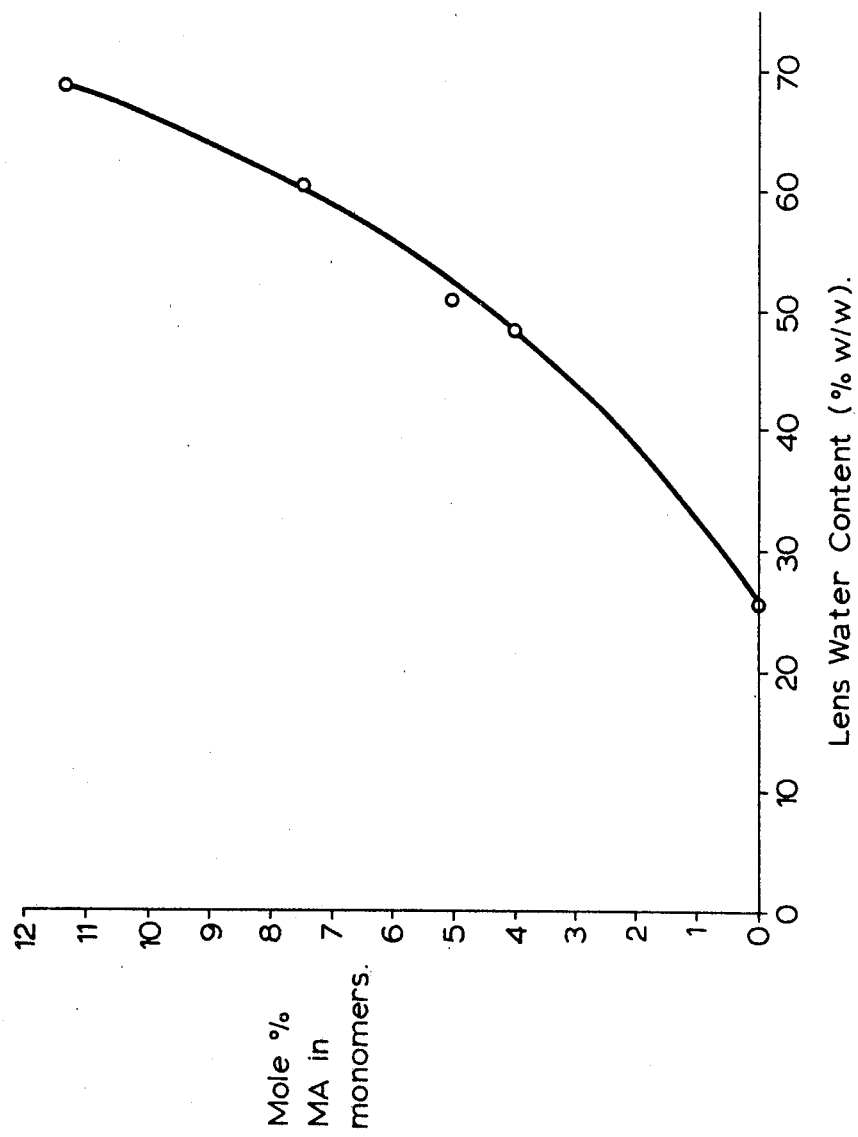

CROSS-LINKED HYDROGEL COPOLYMERS FOR CONTACT LENSES

FIELD OF THE INVENTION

This invention relates to contact lenses and in particular to so-called soft contact lenses which are formed from a hydrogel of a hydrophilic polymer.

BACKGROUND OF THE INVENTION

In British Pat. No. 1,475,605 (J. T. de Carle) contact lenses are described which are formed from 10 to 60% of a vinyl lactam (e.g. vinyl pyrrolidone), up to 3% of a cross-linking agent, such as ethylene glycol dimethacrylate, 0.25 to 5.6% of an unsaturated acid, such as methacrylic acid, the balance being an hydroxyalkyl acrylate or methacrylate. The resulting polymer is hydrophilic and on immersion in an aqueous alkali, carboxylate groups are formed which impart a high degree of water-absorbancy to the polymer. As a consequence the water-swollen gel-like polymers may be produced having water contents up to and above 75% by weight of the hydrated polymer and lenses manufactured from such polymers exhibit a very high atmospheric oxygen transmission rate when in hydrogel form. In fact, the permeability of the lenses to oxygen is so good that the lenses can be worn for extended periods i.e. they need not be removed after 8 hour wearing periods, which is necessary for other commercial lenses in order to satisfy the oxygen requirements of the cornea.

One problem which has been encountered with lenses manufactured in accordance with the above Patent is that they require to be handled with moderate care in order to avoid tearing the lenses when inserting or removing them.

SUMMARY OF THE INVENTION

According to one aspect of the invention there is provided a soft contact lens which is in the form of a hydrogel of a polymer, said polymer comprising the copolymer formed by copolymerising a monomer mixture containing a major proportion of an hydroxyalkyl acrylate or methacrylate, up to 12% by weight of an unsaturated acid, a minor amount of a cross-linking monomer and a minor amount of styrene or a substituted styrene.

The major component of the copolymer is an hydroxyalkyl acrylate or methacrylate and will normally be present in an amount of 70 to 90% by weight of the polymerisable mixture. These compounds can be regarded as the mono acrylic or methacrylic acid esters of a glycol such as ethylene glycol and propylene glycol. Preferred monomers are those in which the alkyl group contains from 1 to 4 carbon atoms, especially 2-hydroxyethyl methacrylate (referred to hereafter as 2-HEMA).

The unsaturated acid or anhydride is preferably a low molecular weight carboxylic acid, e.g. methacrylic acid, acrylic acid and itaconic acid.

While the components of the copolymer may consist essentially of a 2-hydroxyalkyl acrylate or methacrylate, an unsaturated carboxylic acid, styrene or a substituted styrene and a cross-linking monomer, other hydrophilic or hydrophobic monomers may be included. Examples of suitable, compatible hydrophobic monomers are alkyl acrylate or methacrylate esters, such as the methyl ethyl, propyl and butyl esters. Such comonomers if used are employed in minor quantities, e.g. less than 10% by weight of the polymerisable mixture.

Preferably styrene is employed as the sole hydrophobic component of the copolymer, although styrene itself may be partly or wholly replaced with a substituted styrene, such as methyl styrene.

Although the cross-linking monomer may be present in an amount of up to about 5% by weight, it is preferred that the copolymers are lightly cross-linked and 0.1 to 2.0% of cross-linking monomer is preferred, since a high degree of cross-linking tends to reduce the water-holding capacity of the hydrogel while increasing its strength and decreasing its flexibility. The cross-linking monomer is preferably difunctional and preferred materials are glycol diacrylates and dimethacrylates, including diethylene, triethylene and tetraethylene diacrylates and dimethacrylates, divinylbenzene and allylmethacrylate. Poly functional monomers such as triallyl cyanurates or a trimethacrylate may however be used as a part or as the whole of the cross-linking monomer component.

While we do not wish to be bound by any particular theory, it is believed that the reason for the comparatively high tensile strength of the hydrogels of the invention derives from blocks or domains of aromatic hydrophobic moieties (arising from the styrene component) which are distributed throughout the polymer structure and which hydrate to a much lesser extent than the hydrophilic components of the polymer. Electron microscopy of these polymers has revealed the presence of separated domains which have diameters of about 500 Angstrome units and it appears that these domains are distinguished from the general body of the polymer by being rich in hydrophobic segments.

The 'reinforcing' effect of the styrene in the copolymer can be increased by incorporating it in more concentrated sequences, e.g. as a block copolymer of hydrophobic and hydrophilic segments. This can be achieved by employing an uncross-linked styrene copolymer as a starting material and grafting the hydrophilic monomer components onto the polymer. The polymer will have a small concentration of active centres which are reactive with the hydrophilic monomers. For example, a styrene copolymer may be prepared by copolymerising styrene with a minor proportion of a comonomer having two centres of unsaturation e.g. allylmethacrylate. The resulting copolymer will have residual centres of unsaturation arising from the difunctional unsaturated comonomer. A graft copolymer can then be prepared for example by dissolving the styrene copolymer in a monomer mixture containing 2-HEMA, methacrylic acid, cross-linking monomer and a polymerisation initiator. The reaction scheme is illustrated as follows:

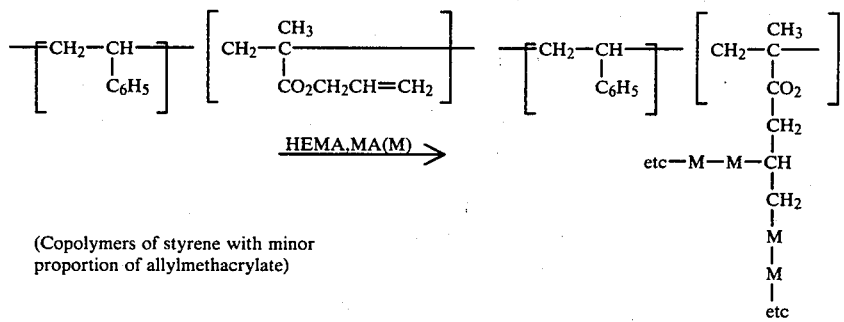

(Copolymers of styrene with minor proportion of allylmethacrylate)

Alternatively, instead of using a monomer containing two unsaturated centres in the preparation of the styrene copolymer, a comonomer may be employed having one unsaturated double bond and a different type of active site which is reactive with the hydroxy acrylate or methacrylate, for example, dimethylaminoethyl methacrylate.

In general, the tensile strength of the copolymer will increase with increasing proportion of styrene monomer in the polymerisation mixture. At the same time, for a given monomer mixture, an increase in the amount of the styrene component results in a decrease in the water-absorbancy of the copolymer. This decrease can be compensated by a corresponding increase in the proportion of unsaturated acid so that by adjusting the amounts of the styrene and unsaturated acid components it is possible to obtain the desired compromise in properties. For example, if a monomer mixture containing 1 mole of 2-hydroxyethyl methacrylate (2-HEMA), 0.106 mole of styrene (ST) and methacrylic acid (MA) is polymerised in the presence of 0.1% of ethylene glycol dimethacrylate (EGDM) and 0.25% of tetraethylene glycol dimethacrylate (TEGDM) (based on the total weight of monomers) the variation in the water content of the resultant copolymers after equilibration in salt solution buffered at p.H. 7.4 is shown graphically in the accompanying drawing. In general, soft contact lenses should have a water content of at least 30% by weight, preferably at least 45%. Thus in the case of the monomer mixtures illustrated in the drawing, preferred amounts of methacrylic acid range from about 0.5 mole %, especially from about 2%, upwards. Normally there is no significant advantage in incorporating more than about 12 to 15% of methacrylic or other unsaturated acid in the copolymers of the invention.

The tensile strength of the hydrogel depends on the styrene content of the copolymer. At least about 4% of styrene is desirable in order to secure a significant increase in tensile strength. In general, if amounts of more than about 30% of styrene are used, hydrogels of the resulting copolymers do not possess sufficiently high transparency for application as soft contact lenses.

Conversion of the acid groups present in the copolymers of this invention to salt groups is conveniently carried out at the same time as hydrating the lens, although salt formation can be effected subsequently to hydration. The simplest procedure is to swell the lenses in a mildly alkaline aqueous salt solution, e.g. a potassium salt solution buffered to a p.H of about 7.5. Although potassium or sodium bicarbonate solutions are preferably employed, other alkali or alkaline earth metal salts, including magnesium and ammonium may be used.

The following Example is given to illustrate the preparation of copolymers in accordance with the invention:

EXAMPLE 2-hydroxyethyl methacrylate (2-HEMA), typically containing 99.4% 2-HEMA, 0.08% ethylene glycol dimethacrylate (EGDM), 0.3% diethylene glycol monomethacrylate (DEGMA), 0.21% methacrylic acid (MA) and 40 ppm mono methyl ether of hydroquinone (MEHQ) (800 g) is mixed with styrene (68.3 g), methacrylic acid (59.1 g), EGDM (0.29 g), tetraethylene glycol dimethacrylate (TEGDM) (13.9 g) and tertiary butyl peroctoate (1.41 g). This gives a composition with the ratio of major ingredients 2-HEMA:styrene:MA of 86.1:7.3:6.6 by weight containing 0.1% w/w EGDM, 1.50% w/w TEGDM and 0.15% w/w tertiary butyl peroctoate on monomers.

The mixture is filtered and oxygen removed by bubbling nitrogen through the mixture for 5 minutes. The mixture is cast in P.T.F.E. button-shaped moulds and polymerised by heating at 55° C. for 20 hours in the absence of oxygen. The castings are post-cured by heating at 100° C. for 3 hours. Contact lenses were machined from the buttons of copolymer and on equilibration in an aqueous salt solution buffered at pH 7.4, the lenses had a water content of 61% with a linear swell of 43%.

Similar lenses were prepared in which the styrene content was 8.9% and methacrylic acid 7.3%, the amount of EGDM and TEGDM was the same and the balance was 2-HEMA.

The following Table gives the properties of the lens produced in the Example compared with a lens produced according to Example 1 of British Pat. No. 1,475,605 (de Carle) and a typical commercial soft contact lens intended for daily wear use (i.e. for continuous wearing for not more than 8 hours).

TABLE

| Property (at 25° C.) | EXAMPLE | COMMERCIAL PRIOR ART LENS | DE CARLE LENS |
|---|---|---|---|
| Linear expansion on hydration in an aqueous salt solution buffered at ph 7.5 | 43 | 18 | 43 |
| Water content (w/w %) | 61 | 39 | 70 |
| Refractive Index (hydrated) | 1.401 | 1,436 | 1,380 |

TABLE-continued

| Property (at 25° C.) | EXAMPLE | COMMERCIAL PRIOR ART LENS | DE CARLE LENS |
| --- | --- | --- | --- |
| Oxygen permeability ($cm^2$/sec × $mlO_2$/mlmm Hg) | $17 \times 10^{-11}$ | $7.3 \times 10^{-11}$ | $30.5 \times 10^{-11}$ |
| Young's Modulus ($Nmm^{-2}$) | 1.39 | 1.14 | 0.36 |
| Burst strength (lbs per sq. inch) | 15 @ 0.08mm* | 12 @ 0.06mm* | 7.5 @ 0.23mm* |

*thickness of lens tested.

It will be seen from the above Table that while the water content and the oxygen permeability of the lens in accordance with the invention are not quite as high as the de Carle lens, these properties of the lens of the invention are substantially superior to those of the typical prior art daily wear lens. Also the burst strength of the lens in accordance with the invention is comparable with or slightly superior to that of the typical prior art lens but very substantially superior to that of the de Carle lens. In addition a lens prepared as in the Example of 0.25 mm thickness was subjected to 10,000 cycles in a laboratory flexometer and was unchanged after this test.

What is claimed is:

1. A soft contact lens having a water content of at least about 30% by weight based on the weight of the hydrated lens, said lens being characterized by a high tensile strength and composed of a hydrated copolymer comprising units from a major proportion of an hydroxyalkyl acrylate or methacrylate, up to 12% by weight of an ethylenically unsaturated acid or anhydride based on the total weight of comonomers, a minor proportion of a cross-linking monomer, and from about 4 to about 30% by weight of styrene or a substituted styrene, with free acid or anhydride groups in the copolymer being in salt form.

2. A lens according to claim 1 wherein the unsaturated acid or anhydride is a carboxylic acid and or anhydride and the free carboxylic acid or anhydride groups are in the form of alkali or alkaline earth carboxylate salt groups.

3. A lens according to claim 2 wherein the unsaturated carboxylic acid or anhydride is present in the copolymer in an amount of from 0.5 to 12% by weight of the total weight of comonomers.

4. A lens according to claim 1 in which the water content of the hydrated copolymer is from 50 to 85% of the total weight of comonomers.

5. A contact lens which comprises a hydrated, sparingly cross-linked copolymer of a major proportion of an hydroxyalkyl acrylate or methacrylate, up to 12% by weight of an ethylenically unsaturated carboxylic acid or anhydride, up to about 5% of a cross-linking monomer and from about 4 to about 30% of styrene or substituted styrene, at least some of the carboxylic acid or anhydride groups in the copolymer being in salt form, the percentages of each comonomer being calculated by weight of the total weight of comonomers.

6. A lens according to claim 5 which is a graft copolymer of a hydrophobic styrene copolymer containing active centers copolymerized with one or more comonomers selected from hydroxy alkyl acrylates or methacrylates and cross-linked with a cross-linking monomer.

* * * * *